United States Patent
Grelaud et al.

(10) Patent No.: US 12,109,995 B2
(45) Date of Patent: Oct. 8, 2024

(54) METHOD AND DEVICE FOR CARRYING OUT A DISTANCE OR SPEED-REGULATING FUNCTION FOR A SINGLE-TRACK MOTOR VEHICLE

(71) Applicant: Robert Bosch GmbH, Stuttgart (DE)

(72) Inventors: Mathieu Grelaud, Ludwigsburg (DE); Michael Schoenherr, Renningen-Malmsheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 252 days.

(21) Appl. No.: 17/637,528

(22) PCT Filed: Aug. 11, 2020

(86) PCT No.: PCT/EP2020/072508
§ 371 (c)(1),
(2) Date: Feb. 23, 2022

(87) PCT Pub. No.: WO2021/063576
PCT Pub. Date: Apr. 8, 2021

(65) Prior Publication Data
US 2022/0281426 A1    Sep. 8, 2022

(30) Foreign Application Priority Data
Oct. 1, 2019  (DE) .................... 10 2019 215 101.9

(51) Int. Cl.
*B60T 8/17* (2006.01)
*B60T 7/22* (2006.01)
(Continued)

(52) U.S. Cl.
CPC .............. *B60T 8/1706* (2013.01); *B60T 7/22* (2013.01); *B60W 30/16* (2013.01); *B62L 3/00* (2013.01);
(Continued)

(58) Field of Classification Search
None
See application file for complete search history.

(56) References Cited

U.S. PATENT DOCUMENTS

| 8,396,642 B2* | 3/2013 | Breuer | B60W 30/16 340/436 |
| 2003/0135318 A1* | 7/2003 | Tellis | B60T 7/22 340/436 |

(Continued)

FOREIGN PATENT DOCUMENTS

| CN | 106166993 A | 11/2016 |
| CN | 107010056 A | 8/2017 |

(Continued)

OTHER PUBLICATIONS

English Translation for FR-2964632-A1 using Google Patents (Year: 2012).*

(Continued)

*Primary Examiner* — Thomas E Worden
(74) *Attorney, Agent, or Firm* — NORTON ROSE FULBRIGHT US LLP; Gerard A. Messina

(57) ABSTRACT

A method for carrying out a distance-regulating or speed-regulating function for a single-track motor vehicle. An activated distance-regulating or speed-regulating function can be deactivated by the driver through actuation of a brake operating element, if the actuation intensity of the brake operating element exceeds a first threshold value. The presence of a collision risk is ascertained by an environmental sensor system. When there is a risk of collision, an emergency braking assistance function is activated through the actuation of the brake operating element by the driver with an actuation intensity exceeding a second threshold value. The second threshold value is lower than the first threshold value. The activated distance-regulating or speed-regulating function is continued independently of the driver after the (Continued)

termination of the emergency braking assistance function, with the settings that were present before the activation of the emergency braking assistance function.

7 Claims, 1 Drawing Sheet

(51) Int. Cl.
   *B60W 30/16* (2020.01)
   *B62L 3/00* (2006.01)

(52) U.S. Cl.
   CPC .... *B60T 2201/022* (2013.01); *B60W 2300/36* (2013.01); *B60W 2420/403* (2013.01); *B60W 2420/408* (2024.01); *B60W 2420/54* (2013.01); *B60W 2540/12* (2013.01); *B60W 2710/18* (2013.01)

(56) References Cited

U.S. PATENT DOCUMENTS

| | | | | |
|---|---|---|---|---|
| 2006/0109094 | A1* | 5/2006 | Prakah-Asante | B60Q 9/008 340/439 |
| 2009/0037055 | A1* | 2/2009 | Danner | B60T 7/22 701/45 |
| 2012/0212353 | A1* | 8/2012 | Fung | G08G 1/167 701/1 |
| 2012/0330528 | A1* | 12/2012 | Schwindt | G01S 13/58 701/96 |
| 2013/0226408 | A1* | 8/2013 | Fung | G08G 1/166 701/1 |
| 2016/0001781 | A1* | 1/2016 | Fung | G07C 9/37 701/36 |
| 2018/0362013 | A1 | 12/2018 | Ungermann | |
| 2020/0023736 | A1* | 1/2020 | Kaneta | B60W 50/029 |
| 2021/0221369 | A1* | 7/2021 | Kashefy | B60Q 1/444 |

FOREIGN PATENT DOCUMENTS

| | | | |
|---|---|---|---|
| CN | 108290607 A | 7/2018 | |
| CN | 109774709 A | 5/2019 | |
| DE | 102013226004 A1 | 6/2014 | |
| DE | 102015217256 A1 | 3/2017 | |
| DE | 102016216745 A1 | 6/2017 | |
| EP | 1609689 A1 | 12/2005 | |
| FR | 2964632 A1 * | 3/2012 | ........... B60T 7/22 |
| JP | 2004291667 A | 10/2004 | |
| JP | 2011183983 A | 9/2011 | |
| JP | 2015110411 A | 6/2015 | |
| JP | 2017200822 A | 11/2017 | |
| WO | 2018061095 A1 | 4/2018 | |

OTHER PUBLICATIONS

International Search Report for PCT/EP2020/072508, Issued Nov. 24, 2020.

* cited by examiner

METHOD AND DEVICE FOR CARRYING OUT A DISTANCE OR SPEED-REGULATING FUNCTION FOR A SINGLE-TRACK MOTOR VEHICLE

BACKGROUND INFORMATION

German Patent Application No. DE 10 2015 217 256 A1 describes a method for carrying out an emergency braking process in a single-track motor vehicle, in which
using an environmental sensor system that acquires the environment in front of the motor vehicle, an accident probability variable is ascertained that describes the probability of an accident of the motor vehicle,
for the case in which, based on an evaluation of the accident probability variable, it is determined that the accident probability exceeds a specified threshold value, a driver-independent emergency braking process of the motor vehicle is initiated.

SUMMARY

The present invention relates to a method for carrying out a distance-regulating or speed-regulating function, or ACC function, for a single-track motor vehicle. In accordance with an example embodiment of the present invention, in the method:
the activated distance-regulating or speed-regulating function can be deactivated by the driver by actuating a brake operating element when the actuation intensity of the brake operating element exceeds a first threshold value,
the presence of a collision risk for the single-track motor vehicle is ascertained by an environmental sensor system attached to the single-track motor vehicle,
when there is a risk of collision, an emergency braking assistance function is activated through the actuation of the brake operating element by the driver with an actuation intensity exceeding a second threshold value, the assistance function boosting the braking intensity corresponding to the actuation intensity independently of the driver,
the second threshold value being lower than the first threshold value,
the activated distance-regulating or speed-regulating function being continued independently of the driver after the termination of the emergency braking assistance function, with the settings that were present before the activation of the emergency braking assistance function.

This permits an embedding of an emergency braking assistance function in a distance-regulating or speed-regulating function. When a short-term strong braking process is required whose strength cannot be reached in the context of the distance-regulating or speed-regulating function, this process can be carried out by the driver using an emergency braking assistant without a deactivation of the distance-regulating or speed-regulating function.

In an advantageous embodiment of the present invention, the emergency braking assistance function is activated only when there is a risk of collision, through actuation of the brake operating element by the driver with an actuation intensity exceeding a second threshold value, if the second threshold value is lower than the first threshold value. In this way, it is ensured that the emergency braking assistance function can be carried out only when there is a risk of collision, without deactivation of the distance-regulating or speed-regulating function.

In an advantageous embodiment of the present invention, the brake operating element is a brake pedal, a brake lever, or a brake rotary handle.

In an advantageous embodiment of the present invention, the single-track motor vehicle is a motorcycle.

In an advantageous embodiment of the present invention, the environmental sensor system is a radar sensor system, a video sensor system, a lidar sensor system, or an ultrasonic sensor system. Such sensor systems are already available in passenger motor vehicles.

In an advantageous embodiment of the present invention, the braking intensity is the braking force, the braking torque, or the brake pressure.

The present invention further includes a device containing means that are designed to carry out the methods according to the present invention. The means are in particular a control device in which the program code for carrying out the method according to the present invention is stored.

DETAILED DESCRIPTION OF EXAMPLE EMBODIMENTS

Figure 1:
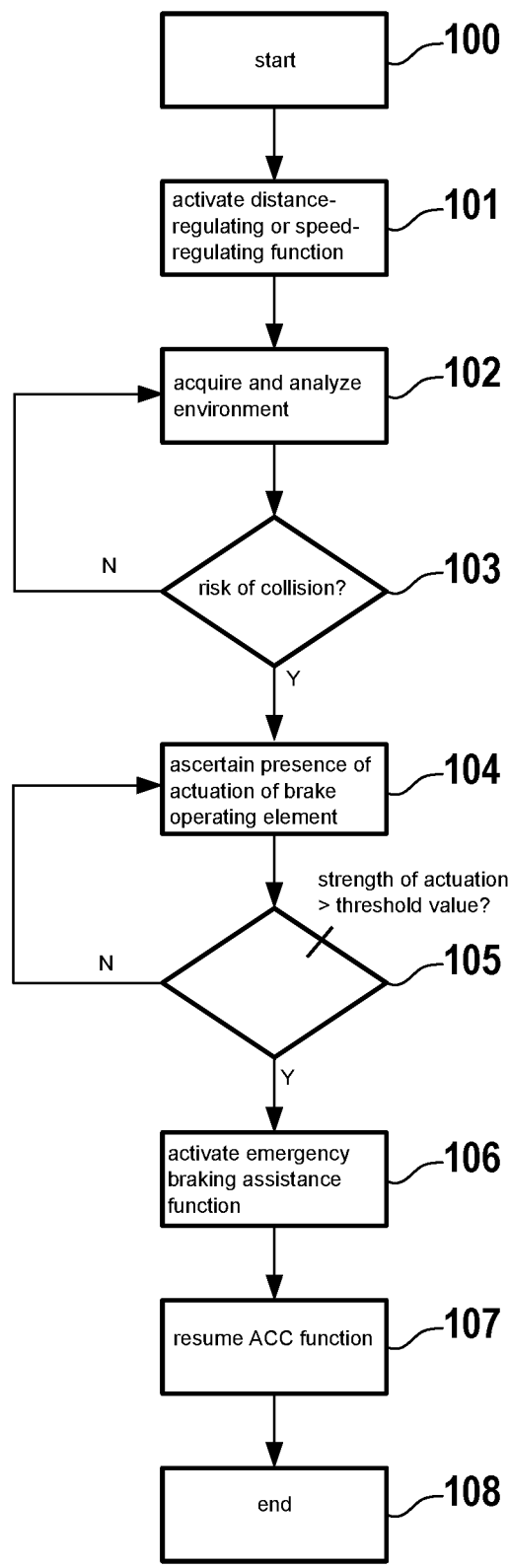
FIG. 1 shows the sequence of an example embodiment of the method according to the present invention.

ACC functions can be deactivated through actuation of the brake operating element by the driver. In addition, it is appropriate to limit the driver-independent brake decelerations in an ACC system to a maximum value in order not to overburden the driver through an unexpectedly strong braking intervention.

A possible emergency braking assistance function for two-wheeled vehicles is based on the consideration that, for safety reasons, this function is activated only when the braking force requested by the driver is not adequate to avoid a collision. The emergency braking assistance function is not triggered in driver-independent fashion, but rather only when the driver initiates a braking via a brake operating element. The emergency braking assistance function then boosts the braking force requested by the driver. As soon as the driver is no longer actuating the brake operating element, the emergency braking assistance function is terminated. In this way, it is ensured that the driver of the two-wheeled vehicle retains as much control as possible over the vehicle.

A combination of the ACC function and the emergency braking assistance function is enabled when the brake operating element threshold values for the triggering of the emergency braking assistance function and for the termination of the ACC function are selected to be different. Here, the triggering threshold value for the emergency braking assistance function is lower than that for the deactivation of the ACC function. When there is a risk of collision, the emergency braking assistance function boosts the braking intensity specified by the driver as long as the driver actuates the brake pedal. After the termination of the emergency braking assistance function, the distance-regulating or speed-regulating function, or ACC function, continues.

FIG. 1 shows the sequence of an embodiment of the method according to the present invention. After the start of the method in block 100, in block 101 the distance-regulating or speed-regulating function, or ACC function, is activated, and in block 102 the environment in front of the single-track motor vehicle is acquired and analyzed by an environmental sensor system attached to the single-track motor vehicle. In block 103, on the basis of the output signals of the environmental sensor system it is ascertained whether there is a risk of collision for the single-track motor vehicle. If this is not the case, then the method returns to block 102. If, however, there is a risk of collision, then in block 104 the presence of an actuation of a brake operating element by the driver is ascertained. In block 105, it is checked whether the strength of actuation of the brake operating element by the driver exceeds a specified threshold value. If this is not the case, then the method returns to block 104. If, however, the actuation strength exceeds the threshold value, then in block 106 the emergency braking assistance function is activated. This function is active as long as the driver actuates the brake operating element. After termination of the emergency braking assistance function, in block 107 the ACC function is resumed, and the method ends in block 108.

What is claimed is:

1. A method for a single-track motor vehicle, the method comprising:
continually performing, by the single-track motor vehicle, surroundings monitoring in which the single-track motor vehicle:
obtains output from one or more environmental sensors; and
determines, based on the output, whether or not the single-track motor vehicle is in a danger state in which the single-track motor vehicle is characterized as being in danger of collision;
in response to a first manual actuation, by a driver of the single-track motor vehicle, of a mechanical interface to a wheel brake of the single-track motor vehicle while a distance-regulating or speed-regulating function of the single-track motor vehicle is active:
comparing, in a first comparison, an intensity of the first manual actuation to each of a first intensity threshold and a second intensity threshold, the second intensity threshold being higher than the first intensity threshold; and
in response to satisfaction of a first predefined programmed condition, of executed program code, that (a) a result of the first comparison is that the intensity of the first manual actuation is above the first intensity threshold and below the second intensity threshold, and (b) a result of the determination of the surroundings monitoring is that the single-track motor vehicle is in the danger state at a time when the first manual actuation occurs:
temporarily interrupting the distance-regulating or speed-regulating function to execute an automatic emergency braking of the wheel brake; and
upon completing the automatic emergency braking of the wheel brake, automatically resuming the temporarily interrupted distance-regulating or speed-regulating function according to settings of the distance-regulating or speed-regulating function that were active when the interrupting was performed without a new activation of the distance-regulating or speed-regulating function by the driver; and
in response to a second manual actuation, by the driver of the single-track motor vehicle, of the mechanical interface to the wheel brake of the single-track motor vehicle while the resumed distance-regulating or speed-regulating function of the single-track motor vehicle is active:
comparing, in a second comparison, an intensity of the second manual actuation to at least the second intensity threshold; and
in response to satisfaction of a second predefined programmed condition, of the executed program code, that a result of the second comparison is that the intensity of the first manual actuation is above the second intensity threshold, cancelling the active distance-regulating or speed-regulating function, so that resumption of the active distance-regulating or speed-regulating function requires a manual reactivation of the active distance-regulating or speed-regulating function.

2. The method as recited in claim 1, wherein the mechanical interface is a brake pedal or a brake lever or a brake rotary handle.

3. The method as recited in claim 1, wherein the single-track motor vehicle is a motorcycle.

4. The method as recited in claim 1, wherein the one or more environmental sensors include at least one of a radar sensor, a video sensor, a lidar sensor, and an ultrasonic sensor.

5. The method as recited in claim 1, wherein the intensities of the first and second manual actuations are measures of a braking force or a braking torque or a brake pressure.

6. The method as recited in claim 1, wherein the program code provides that manual actuation of the mechanical interface:
cancels the distance-regulating or speed-regulating function only if a respective intensity of the manual actuation is above the second threshold;
temporarily interrupts the distance-regulating or speed-regulating function when the single-track motor vehicle is in the danger state only if the respective intensity of the manual actuation is above the first threshold and below the second threshold; and
temporarily interrupts the distance-regulating or speed-regulating function when the respective intensity of the manual actuation is above the first threshold and below the second threshold only if the manual actuation is performed when the single-track motor vehicle is in the danger state.

7. A a single-track motor vehicle that is programmed with program code to execute a method, the method comprising:
continually performing, by the single-track motor vehicle, surroundings monitoring in which the single-track motor vehicle:
obtains output from one or more environmental sensors; and
determines, based on the output, whether or not the single-track motor vehicle is in a danger state in which the single-track motor vehicle is characterized as being in danger of collision;
in response to a first manual actuation, by a driver of the single-track motor vehicle, of a mechanical interface to a wheel brake of the single-track motor vehicle while a distance-regulating or speed-regulating function of the single-track motor vehicle is active:
comparing, in a first comparison, an intensity of the first manual actuation to each of a first intensity threshold and a second intensity threshold, the second intensity threshold being higher than the first intensity threshold; and in response to satisfaction of a first predefined programmed condition, of executed program code, that (a) a result of the first comparison is that the intensity of the first manual actuation is above the first intensity threshold and below the second intensity threshold, and (b) a result of the determination of the surroundings monitoring is that the single-track motor vehicle is in the danger state at a time when the first manual actuation occurs:
  temporarily interrupting the distance-regulating or speed-regulating function to execute an automatic emergency braking of the wheel brake; and
  upon completing the automatic emergency braking of the wheel brake, automatically resuming the temporarily interrupted distance-regulating or speed-regulating function according to settings of the distance-regulating or speed-regulating function that were active when the interrupting was performed without a new activation of the distance-regulating or speed-regulating function by the driver; and in response to a second manual actuation, by the driver of the single-track motor vehicle, of the mechanical interface to the wheel brake of the single-track motor vehicle while the resumed distance-regulating or speed-regulating function of the single-track motor vehicle is active:
  comparing, in a second comparison, an intensity of the second manual actuation to at least the second intensity threshold; and
  in response to satisfaction of a second predefined programmed condition, of the executed program code, that a result of the second comparison is that the intensity of the first manual actuation is above the second intensity threshold, cancelling the active distance-regulating or speed-regulating function, so that resumption of the active distance-regulating or speed-regulating function requires a manual reactivation of the active distance-regulating or speed-regulating function.

* * * * *